Figure 1:
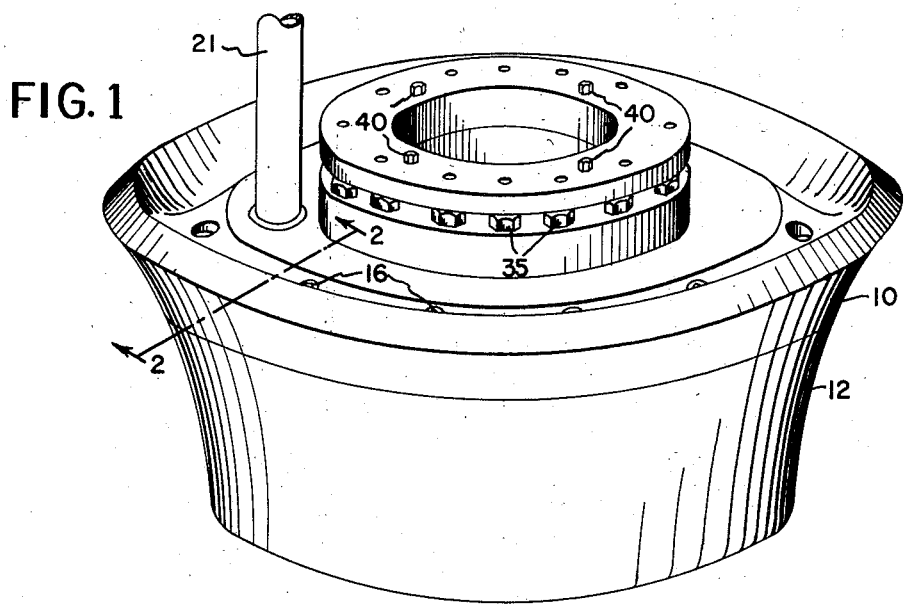

Feb. 25, 1958  R. A. COVINGTON, JR., ET AL  2,824,337
CIRCULAR EXTRUSION DIE
Filed July 28, 1955

INVENTORS
ROBERT A. COVINGTON, JR.
VINCENT H. WALDIN

Harry J. McCauley
ATTORNEY

United States Patent Office 2,824,337
Patented Feb. 25, 1958

2,824,337
CIRCULAR EXTRUSION DIE

Robert A. Covington, Jr., and Vincent H. Waldin, Wilmington, Del., assignors to E. I. du Pont de Nemours and Company, Wilmington, Del., a corporation of Delaware Application July 28, 1955, Serial No. 524,890

4 Claims. (Cl. 18—14)

This invention relates to an extrusion die for substances in the plastic state, and particularly to a circular extrusion die adapted to form a thermoplastic material into a tube which is delivered continuously from the die.

While this invention is applicable for use with plastic materials generally, it is particularly useful as regards thermoplastic substances, which can be molded into a variety of shapes to manufacture commonplace items such as garden hose, heat-sealable bagging stock, and the like, therefrom by extrusion methods. It is usually necessary to employ rather high pressures in the course of thermoplastic extrusion and there exists serious problems as regards the strength and rigidity of the extrusion dies. It is common, therefore, to incorporate in the extrusion dies spiders or bridging members disposed athwart the thermoplastic passage, so as to connect the central plug element of the die with the outside member, thereby enhancing the strength of the construction. In the case of relatively small diameter extrusions such expedients are not particularly objectionable, because the strengthening members are relatively small in size and the nature of the product is such that the plastic stream readily merges together again after passage past the obstruction. Furthermore, the supply passage for the main body of plastic in the die is relatively short for small diameter products and, consequently, there is no serious problem of unequal plastic supply around the entire periphery of the die.

Figure 2:
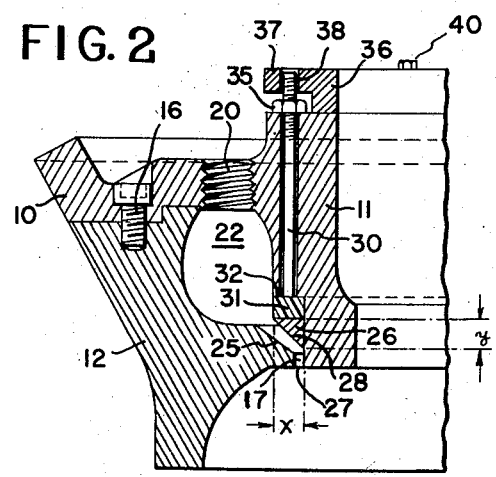
Figure 3:
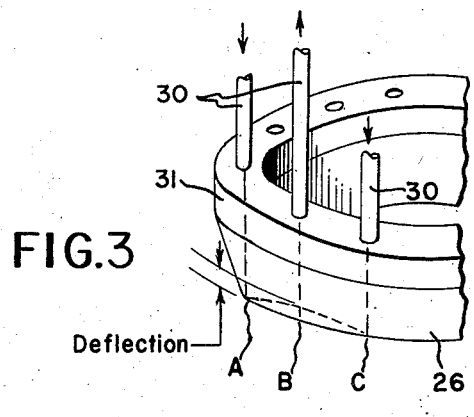

The manufacture of large diameter tubes aggravates the problems of both stream merger and evenness of plastic feed within the die, and it has hitherto been considered impracticable to extrude unitary tubes of diameter in excess of only a very few inches by the use of circular dies. An object of this invention is to provide a circular die adapted to the extrusion manufacture of relatively large diameter plastic tubes. Another object of this invention is to provide a circular extrusion die provided with means for adjusting peripherally the feed of product past the extrusion opening. Another object of this invention is to provide a circular extrusion die which dispenses completely with bridge members or equivalent structures. Another object of this invention is to provide an improved circular die having a relatively low cost and simple construction. The manner in which these and other objects of this invention are attained will become apparent from the detailed description and the following drawings, in which:

Fig. 1 is a perspective view of one embodiment of circular die according to this invention, Fig. 2 is a partial sectional view taken on line 2—2 of Fig. 1, Fig. 3 is a view in perspective of a portion of the axially adjustable ring element of the die shown in Figs. 1 and 2, and Figs. 4–6 are enlarged cross-sectional views of different embodiments of adjustable ring element members shown in association with prefererd profile configurations for the co-operating surfaces of the dies.

Generally, the apparatus of this invention comprises a relatively rigid body portion provided with a retaining cavity for plastic material in open communication with a supply of plastic material under pressure and an annular extrusion passage disposed coaxially of the die body, a plastic flow-directing surface within the retaining cavity ahead of the extrusion passage and terminating at the inner end of the extrusion passage, an axially movable ring element disposed within the retaining cavity in coaxial relationship with the die body with a surface of the ring element opposite the plastic flow-directing surface and defining therewith a plastic-supplying exit opening into the extrusion passage, and a plurality of adjusting elements supporting the ring element in position with respect to the plastic flow-directing surface, the adjusting elements being individually adjustable with respect to the body portion of the die to effect advance or retraction of preselected discrete portions of the ring element axially of the plastic flow-directing surface.

Referring to Figs. 1 and 2 particularly, a preferred construction of die body according to this invention comprises a relatively massive two-part assembly consisting of crown piece 10 which is provided with an integral internal cylindrical portion 11, and the second part consisting of skirt piece 12, which is fixedly secured to crown piece 10 by a number of bolts 16 disposed at appropriate intervals around the circumference of the die.

Crown piece 10 is provided with a thermoplastic supply port 20 which is adapted to receive supply pipe 21 which is connected with a conventional central pressurized molten thermoplastic supply source not shown. The inside of the die is cored out as indicated at 22 to define a thermoplastic supply cavity extending continuously around the inside of the die body, constituting a supply source for the extrusion passage 17 of the apparatus. The extrusion passage 17 is annular in shape and is coaxial with the die body, the tubular product formed by the die being delivered continuously through outlet opening 27.

Improved rigidity of construction results from utilization of the known principles of design applicable to cantilever structures exposed to pressure conditions of the type existing in extrusion dies. Accordingly, it is preferred to fashion the die body with an external concave periphery and to extend the inside portion radially inwardly to define the plastic flow-directing surface 25 of the die.

The cross-sectional profile of skirt piece 12 is sufficiently stiff to withstand without objectionable deflection pressure loads of about 1000 lbs./sq. in., or greater, imposed on cavity 22. It is essential that the structure be relatively more rigid than most dies, since the control function is achieved exclusively by the throttling action of ring element 26 provided with surface 28 disposed opposite surface 25 and, of course, extrusion passage 17 must remain substantially constant in cross-sectional area at all times.

As shown in Fig. 2, ring element 26 can be triangular in cross-section and is adapted to be supported in approximately concentric relationship with respect to surface 25 with its lower vertex above the outlet opening 27 of passage 17. This arrangement provides a feed which is adjustable by the throttling action exerted by ring element 26 in co-operation with surface 25 over a considerable length of the flow path of the liquid plastic, as distinguished from merely regulating the size of an orifice as is customary in flow control, and affords control of the discharge of the viscous material in laminar flow without introducing disruptive turbulence affecting deleteriously the gage and finish of the final product. It will be noted that the opposing surfaces 25 and 28 need not necessarily be parallel and, in fact, in a preferred construction where the inclinations of these surfaces are linear, a greater slope from the horizontal of the order of 5–8° for surface 28, as shown in Fig. 2, was advantageous. The throttling action secured by use of the construction of this invention enables a control of plastic flow by regulation of the resistance interposed by variation of the cross-section of the channel opening into passage 17, and is extremely effective in operation. It is not necessary that ring element 26 interpose the greatest constriction to the plastic flow, as passage 17 may be smaller in cross-section across the line of plastic flow while still reserving the regulation function to ring element 26. Also, while an internal relative disposition of ring element 26 with respect to surface 25 is shown in the drawings, it will be understood that this orientation can be reversed and that then surface 25 will be internal of the co-operating surface of ring element 26. This can be accomplished either by machining cylindrical portion 11 to provide surface 25 thereon and mounting ring element 26 adjacent skirt piece 12 or, preferably, by disposing skirt piece 12 internal of the die body proper and within cylindrical portion 11, which latter is enlarged in diameter a sufficient amount to accommodate skirt piece 12.

Figure 4:
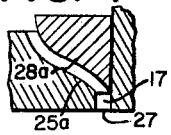
Figure 5:
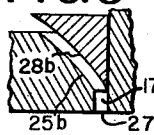
Figure 6:
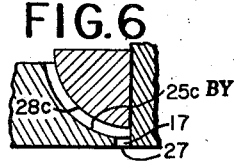

Some flexibility in design is obtainable by virtue of varying the slope of surface 28 to attain improved feeding characteristics when used with particular plastic materials. Thus, the convex-concave profile 28a of Fig. 4 is especially effective under some conditions, while the concave profile 28b of Fig. 5 or the convex profile 28c of Fig. 6 are preferred in other situations. It will be noted that the cross-sectional shapes of the ring elements shown are generally triangular and are thus similar one to another. In these embodiments it is desirable to conform the profile of the interior surface of the die to that of the co-operating surfaces of the ring elements, to obtain regulation over a long flow path and thereby avoid the local effects arising from orifice action, and the appropriate profiles of the associated die surfaces are indicated at 25a, 25b and 25c for each of the constructions in turn.

Referring to Figs. 2 and 3 particularly, ring element 26 is supported by a multiplicity of adjusting rods 30 fixedly attached thereto. Cylindrical portion 11 is provided with drilled passages receiving rods 30 with sufficient clearance to permit the slight axial movement of the rods necessary to obtain the adjustment hereinafter described. Back leakage of thermoplastic into these passages is preferably barred by a circular resilient expansion seal 31 which is interposed on the top of ring element 26 in abutment with step 32 provided at the lower end of cylindrical portion 11.

The upper ends of rods 30 are threaded to receive adjusting nuts 35 and the die assembly is completed by a backing plate 36, which is provided with a flange portion 37 adapted to overlie nuts 35 and thereby provide an abutment surface for the nuts at the upper limits of their travel. As shown in Fig. 2 particularly, the upper ends of rods 30 extend loosely through suitable passages 38 in flange 37, and backing plate 36 is fixedly secured to the top of cylindrical portion 11 by bolts 40. It will be understood that widely different adjusting elements can be employed, such as clamps, magnetostrictively actuated devices or the like, and a broad adjustment arrangement is accordingly contemplated by this invention.

In operation, it will be understood that molten thermoplastic is supplied to the die cavity 22 through the feed pipe 21. For very large dies it may be desirable to supply the feed at several points equally spaced around the periphery of cavity 22; however, this is not particularly necessary with the construction of this invention for the reason that good adjustability is obtainable with the construction we have provided. Each die is constructed for the production of nominal gages of film by providing a plurality of skirt pieces 12 defining different sizes of extrusion passages 17 with cylindrical portions 11. If the reverse orientation of ring element with respect to die body is resorted to, as hereinbefore mentioned, the necessary corresponding part is preselected to achieve the desired gage, the construction being such as to simplify to a maximum the design of interchangeable components to reduce fabrication costs to a minimum.

Preselection of the extrusion passage size is not finally determinative of product gage, for the reason that movable ring element 26 as a whole can be adjusted within limits with respect to surface 25 to further control gage with great accuracy. Even this initial adjustment of ring element 26 can be considered approximate, however, since slight pressure variations or variations of numerous other conditions within cavity 22 almost invariably cause localized differences in feed around the entire circumference of extrusion opening 27. Accordingly, it is necessary to adjust the point clearance of ring element 26 with respect to surface 25, and this is accomplished by tightening nuts 35 against the top surface of cylindrical portion 11 to effect retraction of ring element 26 and, conversely, tightening nuts 35 against the under surface of flange 37 to advance ring element 26 in relation to surface 25. The nature of the adjustment is indicated on a greatly enlarged scale schematically by broken line representation in Fig. 3, points A and C of ring element 26 being advanced, as indicated by the arrows adjacent the corresponding adjusting rods 30, while point B is retracted.

In a typical extrusion die constructed according to this invention, wherein it was desired to form a tubular web 40″ in circumference using a dimethyl terephthalate base thermoplastic heated to 500° F. and maintained under a pressure of 500 p. s. i., ring element 26 was constructed of S. A. E. 4140 steel in triangular cross-sectional shape, as shown in Fig. 2, having a width $x$ of ⅜″ and a height $y$ of ½.″ This ring element was provided with adjusting rods disposed at intervals of 1½″ around the periphery and provided easy axial adjustment over a range of 0.005″, which proved to be entirely adequate for the purpose. The die body proper was fabricated from a conventional tool steel which was essentially free from deforming tendencies in the course of hardening.

From the foregoing it will be apparent that the apparatus of this invention can be modified in numerous respects, wherefor it is intended to be limited only by the scope of the following claims.

What is claimed is:

1. A circular extrusion die comprising in combination a relatively rigid body portion provided with a retaining cavity for plastic material in open communication with a supply of plastic material under pressure and an annular extrusion passage disposed coaxially of said die body, a plastic flow-directing surface within said retaining cavity ahead of said extrusion passage and terminating at the inner end of said extrusion passage, an axially movable ring element disposed within said retaining cavity in coaxial relationship with said die body with a surface of said ring element opposite said plastic flow-directing surface and defining therewith a plastic-supplying exit opening into said extrusion passage, and a plurality of adjusting elements supporting said ring element in position with respect to said plastic flow-directing surface, said adjusting elements being individually adjustable with respect to said body portion to effect advance or retraction of preselected discrete portions of said ring element axially of said plastic flow-directing surface.

2. A circular extrusion die according to claim 1 wherein said adjusting elements consist of rods threaded at the ends opposite said ring element to receive adjusting nuts adapted to bear against adjacent fixedly located surfaces so as to, at one extreme of position, impose deflecting compressive stresses through said rods on said ring element, and, at the other extreme of position, impose deflecting tensile stresses through said rods on said ring element.

3. A circular extrusion die according to claim 1 wherein said ring element is generally triangular in cross-section.

4. A circular extrusion die comprising in combination a relatively rigid body portion provided with a retaining cavity for plastic material in open communication with a supply of plastic material under pressure and an annular extrusion passage disposed coaxially of said die body, a plastic flow-directing surface within said retaining cavity ahead of said extrusion passage and terminating at the inner circumference of said extrusion passage, an axially movable ring element disposed within said retaining cavity in coaxial relationship with said die body with a surface of said ring element opposite said plastic flow-directing surface and defining therewith a plastic-supplying exit opening into said extrusion passage, a plurality of adjusting elements supporting said ring element in position opposite said plastic flow-directing surface, a backing plate fixedly secured to said body portion in a position overlying the ends of said adjusting elements opposite said ring element, and means selectively abutting said backing plate to impose deflecting compressive stresses on preselected discrete portions of said ring element through said adjusting elements, and the surface of said body portion adjacent said backing plate to impose deflecting tensile stresses on preselected discrete portions of said ring element through said adjusting elements.

References Cited in the file of this patent
UNITED STATES PATENTS

| 2,044,961 | Waner | June 23, 1936 |
| 2,239,408 | Wallace | Apr. 22, 1941 |
| 2,529,897 | Bailey et al. | Nov. 14, 1950 |